United States Patent [19]
Brandt

[11] Patent Number: 6,134,508
[45] Date of Patent: *Oct. 17, 2000

[54] SIMPLIFIED SYSTEM FOR DISPLAYING USER-SELECTED FUNCTIONS IN A BICYCLE COMPUTER OR SIMILAR DEVICE

[76] Inventor: Jobst Brandt, 351 Middelfield Rd., Palo Alto, Calif. 94301

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,040

[22] Filed: Jul. 1, 1996

[51] Int. Cl.[7] .......................................... B26J 3/00
[52] U.S. Cl. ........................... 702/142; 340/432; 345/333
[58] Field of Search .................... 364/561, 565, 364/566, 551.01, 927.2; 395/339, 333, 334; 702/142, 155, 165, 176, 178; 340/425.5, 432, 438, 441; 345/112, 115, 116, 326, 333, 334, 339, 342, 344

[56] References Cited

U.S. PATENT DOCUMENTS

| | | | |
|---|---|---|---|
| 4,787,040 | 11/1988 | Ames et al. .................................. | 701/1 |
| 4,807,639 | 2/1989 | Shimizu et al. .......................... | 128/690 |
| 4,841,280 | 6/1989 | Hermann et al. ........................ | 340/706 |
| 5,087,910 | 2/1992 | Guyot-Sionnest ....................... | 340/711 |
| 5,408,444 | 4/1995 | Kita et al. ................................ | 368/47 |
| 5,450,325 | 9/1995 | Rodriguez ............................... | 702/165 |
| 5,519,410 | 5/1996 | Smalanskas et al. ....................... | 345/7 |
| 5,621,382 | 4/1997 | Yamamoto ............................... | 340/432 |
| 5,818,428 | 10/1998 | Eisenbrandt et al. .................... | 345/173 |
| 5,880,710 | 3/1999 | Jaberi et al. ............................. | 345/117 |

OTHER PUBLICATIONS

Iotech 1995 Catalog, unattributed pp. 79, 88–91, 100–103, 205–206 & 232, 1995.

*Primary Examiner*—Marc S. Hoff
*Assistant Examiner*—Craig Steven Miller
*Attorney, Agent, or Firm*—Cooley Godward LLP

[57] ABSTRACT

A programmable cycling computer including a display having at least a bit-mapped portion, the cycling computer having user-actuable means for permitting the user to specify the sequence, position and selection of displayed data for a plurality of user-selected functions.

29 Claims, 7 Drawing Sheets

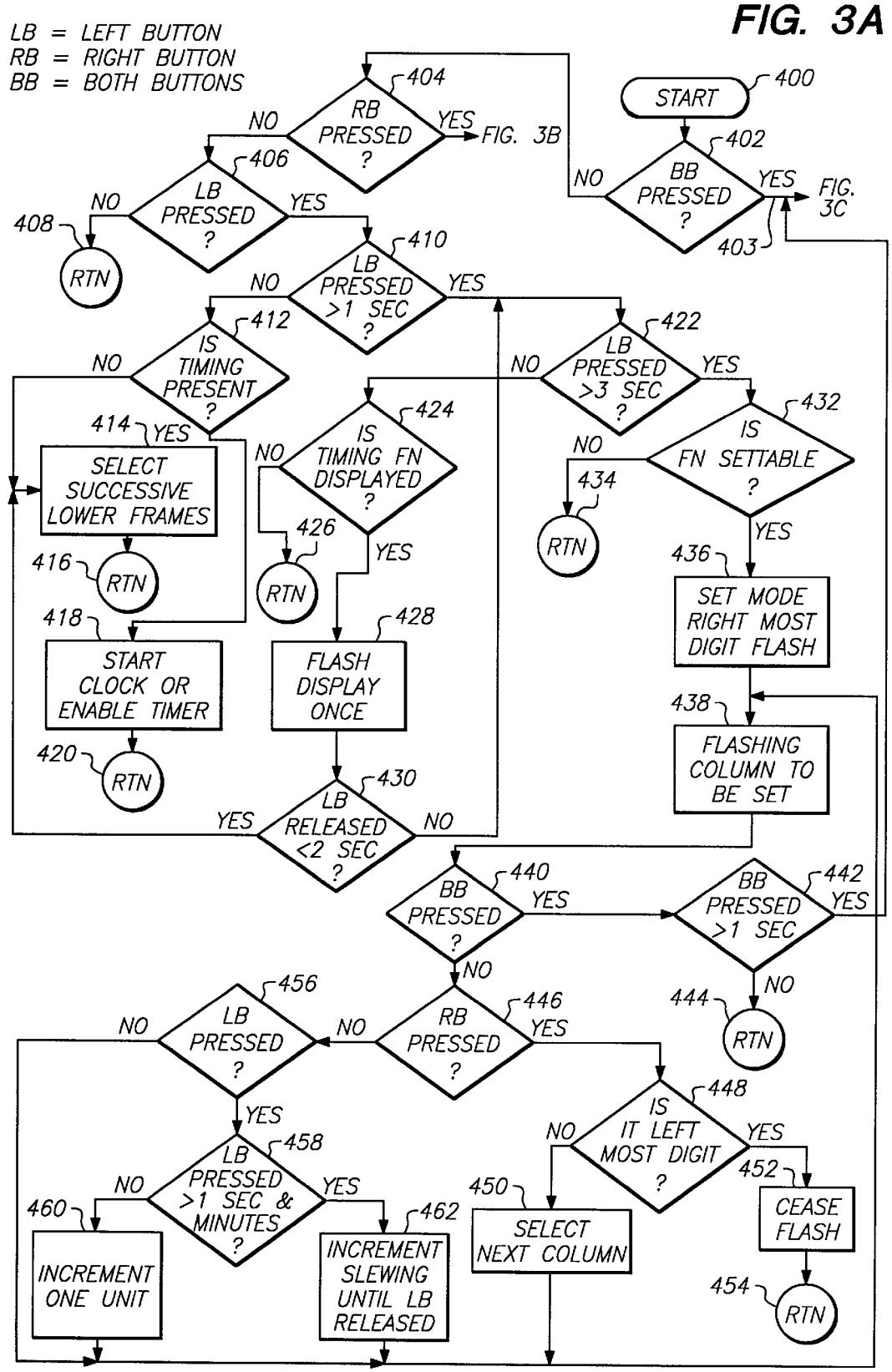

SIMPLIFIED SYSTEM FOR DISPLAYING USER-SELECTED FUNCTIONS IN A BICYCLE COMPUTER OR SIMILAR DEVICE

FIELD OF THE INVENTION

The present invention relates generally to cycling computers, and more particularly to cycling computers having programmable features and to displays for such computers.

BACKGROUND OF THE INVENTION

As with participants in many fields of sports, many cyclists enjoy quantifying and maintaining statistical information about their performance, including speed, elapsed time, distance traveled and other data. Various devices are known in the art for tracking some of such data, and some of these devices are capable of tracking several types of such data. In addition, certain devices offer on/off programmability so that features can be excluded through their operating buttons. Unfortunately—and typical of most if not all of the cycling computers presently available—these devices typically cannot be programmed simply, making it nearly impossible for a rider to program such a cycling computer.

In most such prior art devices, the display is divided into primary and secondary functions. Secondary functions are typically displayed in a lower portion of the display. The user is permitted to scroll through available functions sequentially by pressing one or more buttons or switches. However, in each such instance the degree of customization by the user is typically limited to omitting one or two functions from the capabilities of the device.

In addition, typically displays for such devices have been limited to multi-segment displays. In many cases the displays are alphanumeric, but are limited to displaying data in only fixed locations.

There has therefore been a need for a device of sufficient simplicity—yet at the same time retaining the computational power and flexibility of conventional complicated systems—that a cyclist can reliably program or otherwise use the device and display the selected data in a plurality of locations.

SUMMARY OF THE INVENTION

The present invention provides a programmable cycling computer, particularly suited to use with bicycles, which overcomes most, if not all, of the objections to the prior art. The programmable cycling computer of the present invention includes a microprocessor-based computation system capable of measuring and reporting a variety of data associated with the operation of the bicycle. In one embodiment, the cycling computer evaluates and keeps current all functions for recall at any time, whether or not a specific function is part of the current program.

In addition, but just as importantly, the invention also includes a simple, easy to use interface having a limited number of buttons (for example, two), and a suitable display for reporting the selected information. The display can be configured as a single window or as multiple windows, to permit efficient but prominent display of the data selected by the user. In one embodiment, the windows include upper and lower frames or fields in which data may be displayed.

To provide increased flexibility for the user, the cycling computer of the present invention may be programmed by the user to allow the user to specify the sequence, position and selection of displayed data. Thus, the user can program the invention to select which of the numerous functions will be displayed, in which of the available windows that function will be displayed, and the sequence in which other available functions may be displayed. Typical functions capable of being displayed include: speed, maximum speed, average speed, travel time of the average, distance for that average, altitude, cumulative altitude (trip and total), trip distance, total distance, countdown distance, countdown timer, cadence, stop watch, clock, and others.

In addition, the display, or annunciator, of the present invention includes a dot matrix or bit-mapped device which permits a plurality of desired features to be interchangeably displayed at various display locations. In this manner the user is permitted to display data at a selected location, rather than being limited to the specified locations of the prior art. In some embodiments, the dot matrix display may form only a portion of the display, with conventional multi-segment display elements used for numeric fields.

A further aspect of the invention includes providing a method by which functions not part of the current program may be displayed. An "interrogate" or inquire function may be provided in at least some embodiments, whereby the user can examine the state of many, or in some cases all, of the available data collection functions even though those functions are not part of the underlying program.

It is therefore one object of the present invention to provide a programmable cycling computer capable of being programmed and used simply.

It is a further object of the present invention to provide a programmable cycling computer in which the sequence, position and selection of displayed data can be programmed.

It is a further object of the present invention to provide a programmable cycling computer having pre-programmed configurations of functions.

It is a further object of the present invention to provide a bicycle computer that evaluates and keeps current a plurality of functions for recall, whether or not those functions are part of the current program.

It is a still further object of the present invention to provide a method for displaying on a cycling computer a plurality of functions whether or not those functions are displayed as part of the current program.

It is a still further object of the present invention to provide a display for a cycling computer in which at least a portion of the display is capable of displaying bit-mapped data.

These and other objects of the invention may be better appreciated from the following detailed description of the invention, taken together with the appended figures.

THE FIGURES

FIGS. 3A–3E show in flow diagram form an initial level of the flow diagram for the software of the present invention.

DETAILED DESCRIPTION OF THE INVENTION

Figure 1:
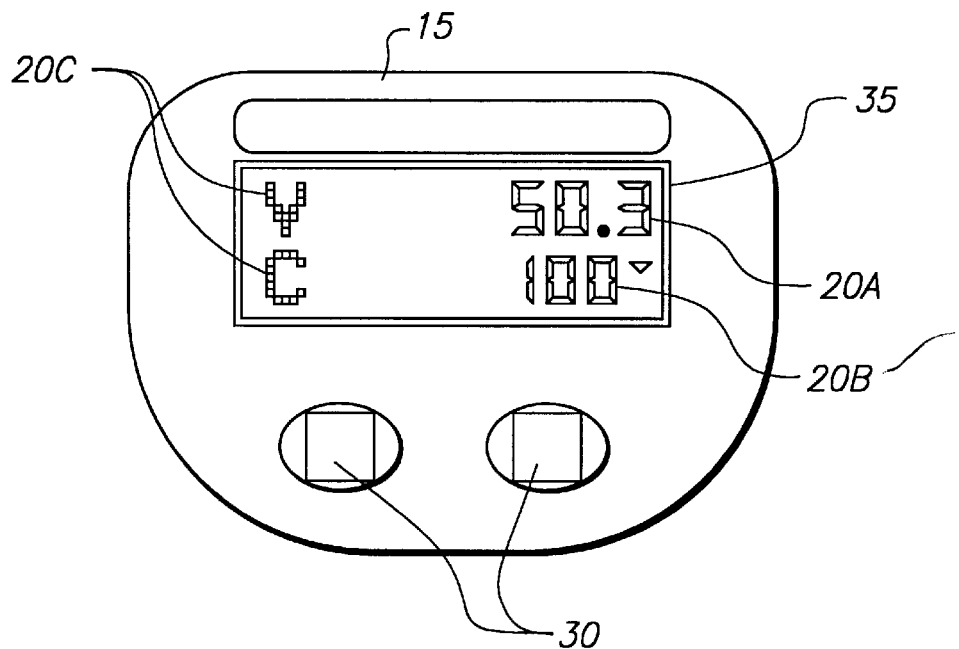
FIG. 1 shows in block diagram form a generalized arrangement of the system of the present invention.

Referring first to FIG. 1, the general arrangement of a programmable cycling computer 10 is shown. A display 15 typically comprises two numeric fields comprising an upper field or frame 20A and a lower field or frame 20B, and in a presently preferred embodiment the two frames may be thought of as recallable windows 25. In such an embodiment, only two frames (hereinafter generally referred to as "upper" and "lower") are displayed at a time to permit the rider to capture the displayed information at a glance while riding. Each upper frame defines a window, and each window may contain one or more lower frames. While the presently preferred embodiment includes only two frames in the display, other arrangements are acceptable for other implementations, such as a single larger display. For similar reasons, the presently preferred embodiment uses only two buttons 30 for entering data or programming the device in a manner described in greater detail hereinafter. The display 15, buttons 30 and related electronics are housed in a case 35. Mounting hardware 40, permits the user to attach the cycling computer to the cycle at a convenient viewing position. It will be appreciated that, although the present invention is particularly suited to use with bicycles, it has applications with many forms of vehicles including many varieties of cycles.

Figure 2C:
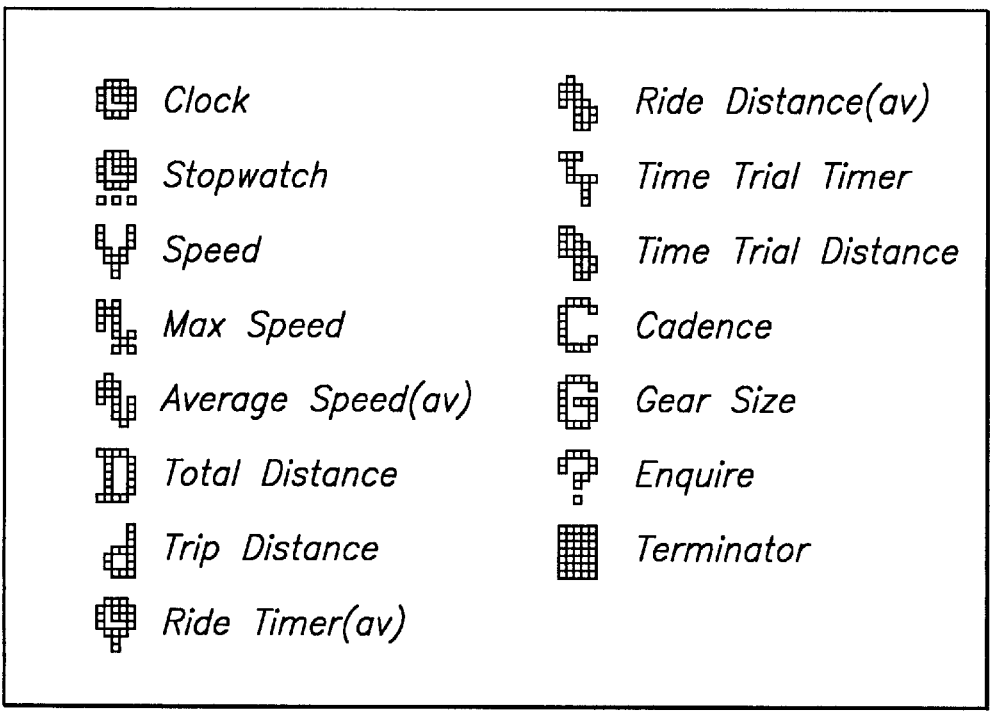
FIG. 2C shows an exemplary group of functions from which the program of FIG. 2B may be selected.
Figure 2A:
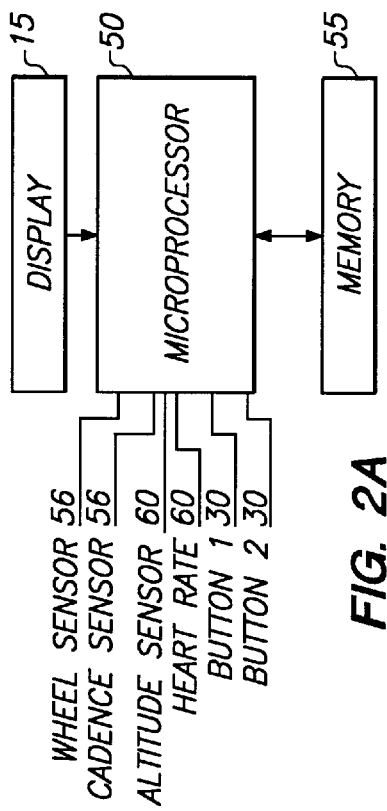
FIG. 2A shows in schematic block diagram form the key circuit elements of the present invention.

Now referring to FIG. 2A, the primary circuit elements of the present invention are shown in schematic block diagram form. The display 15 receives output data from a microprocessor 50, which retrieves data from a memory 55 and also can accumulate data from a wheel sensor and/or a cadence sensor 56. Programs for the device are maintained in the memory device 55. Buttons or switches 30 provide inputs from the user to the microprocessor 50. Various other inputs 60 may be provided, such as speed, heart rate, altitude or other data. A conventional power source such as a battery or solar cells is required but not shown. A startup program is maintained within the memory 55, and is initiated upon application of power, such as installation of a battery. In addition, pre-arranged configurations for the sequencing, position and selection of the various available functions, referred to hereinafter as "programs," may also be stored in the memory 55. In a presently preferred embodiment, three such pre-arranged programs are stored in memory, as well as space for one user-defined program.

Each of the frames 20 which form the display 15 typically comprises five digits, usually through the use of seven segment characters. Colons and periods which do not affect digit spacing are also provided. In addition, up and down arrows and various symbols such an "mi" and "km" are provided. To identify the function being displayed, a dot matrix or other bit-mapped alphabetic or alphanumeric annunciator 20C is provided adjacent each numeric field, so that an exemplary overall display may be as follows:

$$X \quad 88888 \quad \overset{\blacktriangle}{\text{km}}$$
$$\text{or} \quad X \quad 88888 \quad \underset{\blacktriangledown}{\text{mi}}$$

where "X" indicates an annunciator element such as a dot matrix which can display any of a wide variety of characters or icons. Other arrangements may be readily envisioned by those skilled in the art. In a presently preferred embodiment, the annunciator need include only two characters, although different arrangements may be desirable depending upon the application.

To select a mode other than that in which the system is currently operating requires actuation of one or both switches in a predetermined sequence. Although numerous alternatives exist, the following conventions for keystrokes, or button actuations, have been found workable. In a presently preferred embodiment, the action caused by the keystroke takes effect on release of the button. This permits sensing of timed key depressions (and particularly timed key depressions involving both keys) as well as delayed action, two button action, and cancellation of erroneous commands. For convenience, depressing a button for less than one second is considered a momentary actuation. Pressing a button for betweem one and three seconds invokes Delayed action. Pressing one button longer than three seconds, or pressing both buttons for between three and six seconds, invokes Setup mode. A related sequence will cause the system to enter Programming mode.

In general, the method of operation of present invention may be understood from the following. Fundamental to the method is the display for such data. As previously noted, in a presently preferred embodiment the display comprises a primary upper field with a secondary lower field. Together, these related fields, or frames, make up a window. While more frames can be shown within a window for some embodiments, it has been determined that having more than two frames makes the data somewhat difficult to capture while riding a bicycle, even for experienced riders.

Figure 2B:
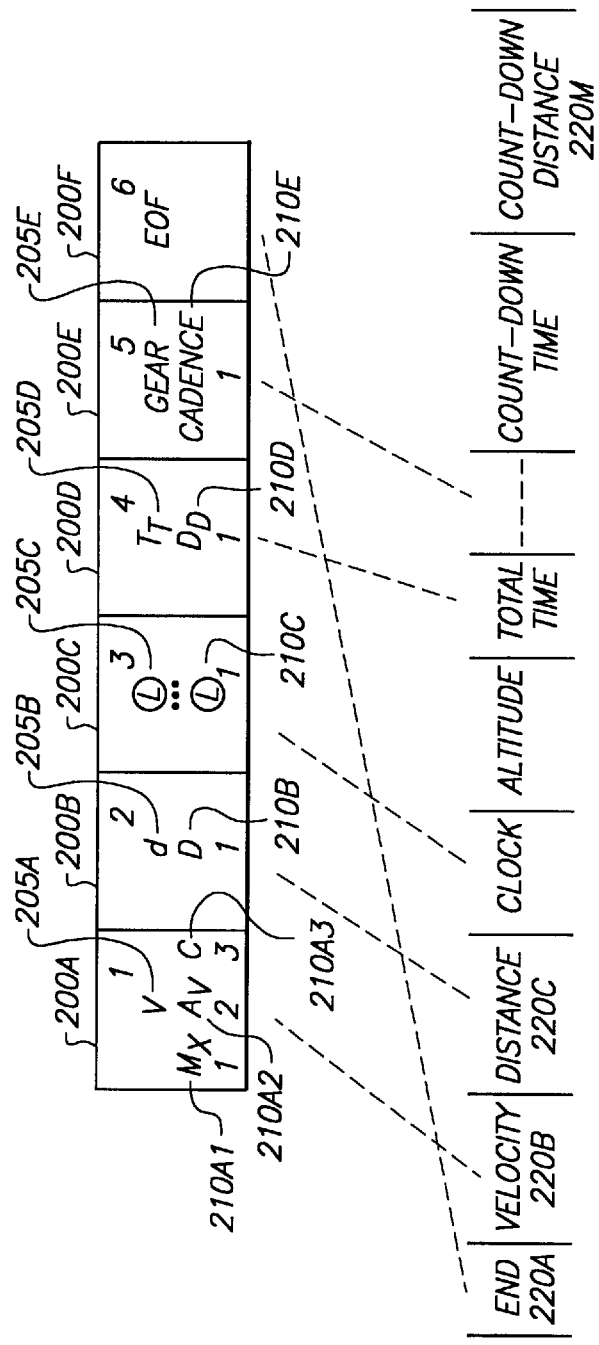
FIG. 2B shows a program according to the present invention, including a plurality of windows having one upper frame and one or more lower frames, drawn from a plurality of available functions.

With reference next to FIGS. 2B, the arrangement of functions for display in windows having upper and lower frames may be better appreciated. FIG. 2C shows an exemplary pool of functions from which a user may select functions to be displayed, although the pool shown is clearly not exhaustive. Shown in FIG. 2B is a five-window program, in which the functions selected for sequential display comprise windows 200A–200E. In addition, a last window 200F is an "END" or "end of file" function, which is not typically displayed during normal operation. Each of the windows includes one upper frame 205A–E, and one or more lower frames 210A–E. In a typical embodiment, a window displays only the upper frame and one of the lower frames at a time, where more than one lower frame exists. Thus, for windows 200A, velocity has been selected for display in the upper frame, while three related functions (maximum speed, average speed, and cadence) are shown in three lower frames. Similarly, distance is shown in the upper frame of window 200B, while total distance is shown in the single lower frame. In window 200C, however, the clock function shown in the upper frame has no associated lower frame, so the clock function is replicated in the lower frame to avoid a blank frame. The functions selected for display are chosen from a pool of available functions 220A–n. The program may, but need not, include all available functions. The display of a particular function in either an upper or a lower frame of a window may be changed. Similarly, the sequence in which the selected functions may be displayed can be changed. Thus, for FIG. 2B, the dashed lines indicate functions selected for display in a different order than might initially occur.

Referring next to FIGS. 3A–3E, the programmability of the present invention may be better appreciated. In general, a program mode is provided to enable customizing the sequence, position, and selection of displayed data. In a typical embodiment, the user can select among various functions, including speed, maximum speed, average speed, travel time of the average distance for that average, trip distance, total distance, countdown distance, countdown time, cadence, stop watch, clock, and others. These functions are displayed in user-selectable combinations of successive two-frame windows.

The initial program may be altered by replacing, deleting or inserting frames or windows. By convention for a typical embodiment, any frame can be reassigned to display any available function. Deleting the upper frame of a window deletes its associated lower frames. Likewise by convention for a presently preferred embodiment, each frame comprises two windows. Deleting the only lower window of a frame causes that lower window to display the same information as the upper frame, since blank frames are not allowed. If the lower frame which is deleted is not the only lower frame available for that window, the next lower frame in sequence is advanced to the current position.

In a presently preferred embodiment, the functions performed by the cycling computer are all active at all times during operation of the device, even though many of the functions are not displayed or, perhaps, not even part of the user-specified program for data display.

In addition to the functions available for display, various hidden functions are also provided. In this instance, "hidden" functions are functions which are preferably excluded from the sequential loop of functions which can be displayed. Such functions are usually excluded from the loop functions because they are used and set independently from such other functions. Examples of "hidden" functions includes time trial distance and time, or gear and cadence. Such functions may be arranged to occupy their own window, and accessed through a pre-arranged sequence of keystrokes. For example, in a device according to the present invention, hidden functions may be accessed during programming. The program is advanced to the desired position, where the left button is pressed for approximately one second. The hidden function is then inserted as a new window with an indicator (e.g., "H") which indicates the hidden nature of the function. The hidden function may then be deleted. In the presently preferred embodiment such functions may not be "unhidden", but can be deleted or added at appropriate other positions in the sequence.

As previously noted, all recording functions accumulate data whether or not they have been selected for display. The method of the present invention includes an inquire function (which may be a hidden function) by which the user can cause the display of all recording functions, whether or not part of the current user program. For example, the inquire function may be accessed by a three second press of the right button. It is not necessary, in all embodiments, that all functions be displayed in response to the inquire function, although it is presently preferred that at least some of the functions not currently selected for program display be displayed in response to the inquire function.

As noted above, the system of the present invention includes several prestored programs—that is, several arrangements of functions which may be sequentially displayed in the windows by pressing one or more of the buttons on the device. When the device is programmed by the user, those prestored programs may be modified to reorder the data, or reposition it in the windows, by a process of editing. Any of the available functions can be assigned to any frame. The editing process includes both deletion of a function from an existing frame, and insertion of a different function into an existing frame.

In a preferred embodiment, editing occurs only once the programming mode has been entered by pressing and holding the left button. Then, a frame may be deleted from the present sequence by momentarily pressing both buttons. Subsequent functions are not altered. Alternatively, the user may delete all subsequent functions by inserting an "END" function at a user-specified point in the sequence.

A selected function may be inserted into a sequence at the current frame by, in a preferred embodiment, momentarily pressing the right button. The program then advances to the next frame. Alternatively, a selected function may be inserted ahead of the current program position by pressing the right button and holding it for, for example, one second. After such period, the insertion is made and the program will advance. In a presently preferred embodiment, no blank frames are permitted, so the function that was previously in the upper frame will now be displayed in the lower frame. If the insertion was to a lower frame, the function previously located in that frame will be incremented by one for display later in the sequence. Inserting "END" ahead of a window deletes all following windows. Inserting "END" in the lower frame of a window deletes all following frames of the window.

During programming the annunciator portion of the display is preferably configured to display the function that previously occupied that position in the sequence. The numeric field typically indicates the number of the window or frame to be assigned. It the location is empty, "END" will be displayed.

Figure 3B:
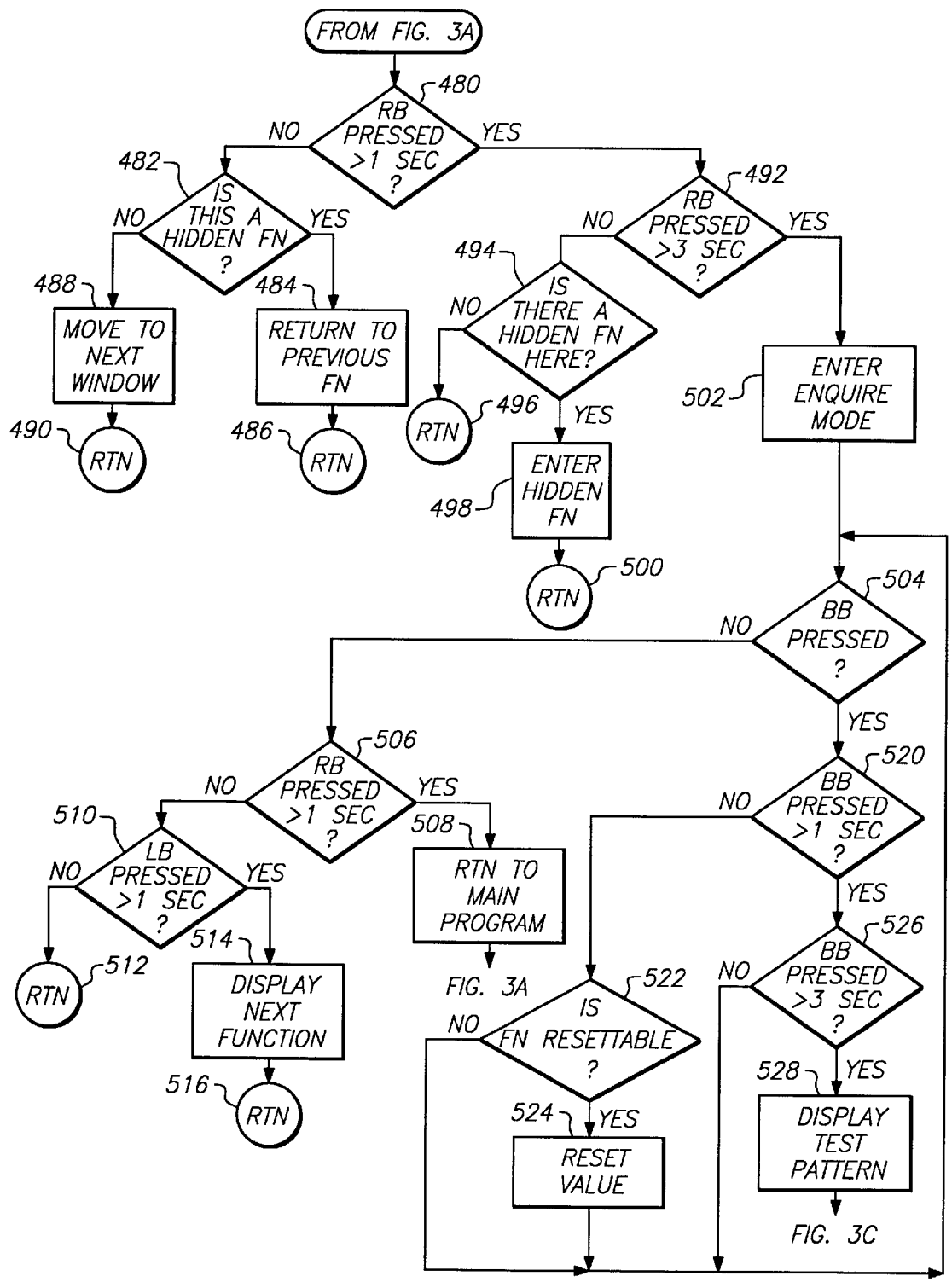

The foregoing general description of the system of the present invention may be appreciated in greater detail by reference to FIGS. 3A–3E, and beginning with FIG. 3A. The program starts at step 400, and at step 402 checks whether both buttons have been depressed substantially simultaneously. If so, the program branches at 403 and continues at FIG. 3C. If not, a check is made at step 404 to determine if the right button has been depressed. If so, the program branches and continues at FIG. 3B. If not, a check is made at step 406 to determine if the left button has been depressed.

If the left button has not been depressed, then no action has occurred and the program returns at step 408. However, if the left button has been depressed, a check is then made at step 410 to determine how long the button has been depressed. It will be appreciated that, in a presently preferred embodiment of the present invention, all button functions take effect on the release of the button. If the left button has been depressed for no longer than one second, the program advances at step 412 to determine if a timing function is present. If not, the program advances at step 414 to permit successive lower frames to be selected, after which the program returns at step 416. If a timing function is present at step 412, the program advances at step 418 to start the clock or enable the timer, after which the program returns at step 420.

If, on the other hand, the left button has been depressed for more than one second, a check is made at step 422 to determine if the button has been depressed for more than three seconds. If not, the program branches and checks, at step 424, to determine if a timing function is displayed. If not, the program returns at step 426. If so, the display is flashed once, at step 428, after which a check is made at step 430 to determine if the left button has been released after being depressed less than three seconds. If the left button was not released in less than three seconds, the program jumps back to step 422; if it was released in less than three seconds, the program jumps to step 414.

If, at step 422, the button is determined to have been depressed more than three seconds, the program advances to step 432, where a check is made to determine whether the current function is settable. If not, the program returns at step 434. If so, the program enters the "set" mode at step 436 and flashes the right-most digit, after which the column to be set is flashed at step 438.

An inquiry is then made at step 440 to determine if both buttons have been depressed. If yes, the program advances to step 442, where a check is made to see if both buttons were depressed for longer than one second. If not, the program returns at step 444. If so, the program jumps to 403 and continues at FIG. 3C.

If the result at step 440 was a no, a check is then made at step 446 to determine if the right button was depressed. If so, a check is then made at step 448 to determine whether the display is flashing the left most digit. If not, the next column to the left is selected at step 450, and the program then jumps to step 438. If so, however, the program ceases flashing the display at step 452, and returns at step 454.

If the result at step 446 was a no, i.e., the right button was not depressed, a check is then made at step 456 to determine whether the left button has been depressed. If no, the program jumps to step 438. If yes, an inquiry is made at step 458 to determine if the left button has been depressed greater than one second while minutes is displayed. If not, the display is incremented one unit at step 460. If so, increment stewing mode is entered at step 462, and the display is rapidly incremented until the left button is released. After either step 460 or 462, the program returns to step 438.

As previously discussed, if the right button only was depressed as determined at step 404, the program branches. Referring next to FIG. 3B, a check is then made at step 480 to determine if the button was depressed more than one second. If a no results, a check is then made at step 482 to determine whether the current function is a hidden function. If so, the program returns to the previous function at step 484, and then returns at step 486. If not, the program advances to the next function at step 488, and then returns at step 490.

If the result at step 480 is a yes, a check is made at step 492 whether the right button was depressed greater than three seconds. If no, a check is then made at step 494 whether a hidden function is present. If no, the program returns at step 496. If yes, the program advances and enters the hidden function at step 498, after which the program returns at step 500.

If, at step 492, the right button was depressed longer than three seconds, the system enters "enquire" mode at step 502. A check is made at step 504 to determine whether both buttons have been depressed. If no, a check is made at step 506 to determine whether the right button has been depressed for longer than one second. If so, the program advances to step 508 and returns to the main program (FIG. 3A). If not, a check is then made at step 510 to determine whether the left button has been depressed longer than one second. If not, the program returns at step 512; if so, the program advances to step 514 and displays the next function, after which it returns at step 516.

If, at step 504, both buttons were found to have been depressed, an inquiry is then made at step 520 to determine whether both buttons were pressed for longer than one second. If not, an inquiry is then made at step 522 to determine whether the current function is resettable. If so, the value of the current function is reset at step 524, and the program loops back to step 504. If the result at step 522 is no, the program also loops back to step 504.

If the result at step 520 was a yes, a further inquiry is made at step 526 to determine whether both buttons have been depressed longer than three seconds. If not, the program loops back to step 504. If yes, a test pattern is displayed at step 528, and the program continues at 403, shown in FIG. 3C.

Figure 3C:
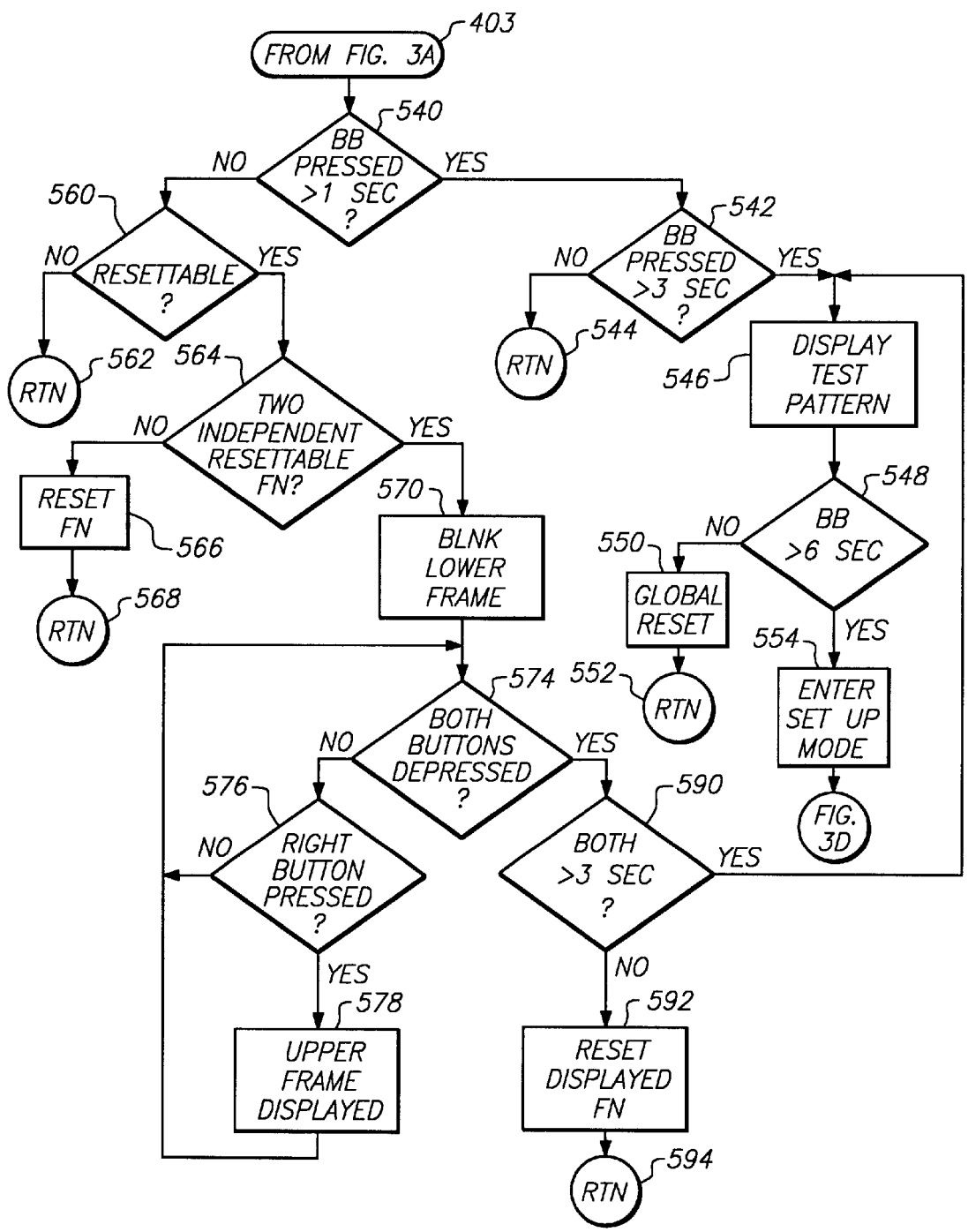

Referring next to FIG. 3C, the events which occur when both buttons have been depressed in steps 402 (FIG. 3A) or 526 (FIG. 3B) may be better appreciated. A further inquiry is made at step 540 to determine whether both buttons have been depressed longer than one second. If yes, a further inquiry is made at step 542 to determine whether both buttons have been depressed longer than three seconds. If not, the program returns at step 544. If yes, the program advances to step 546 to display a test pattern, after which a still further inquiry is made at step 548 to determine whether both buttons have been depressed longer than six seconds. If not, a global reset is performed at step 550, after which the program returns at step 552. If yes, the program enters the "setup" mode at step 554, and thereafter continues in FIG. 3D, described hereinafter.

If, at step 540, the result is a no, an inquiry is then made at step 560 to determine whether the current function is resettable. If not, the program returns at step 562. If yes, a further inquiry is made at step 564 to determine whether the current window includes two independently resettable functions. If not, the current function is reset at step 566 and the program returns at step 568. If the result at step 564 is a yes, the program advances to step 570 and blinks the lower frame. A further inquiry is then made at step 574 to determine whether both buttons are depressed. If not, an inquiry is made at step 576 to determine whether the right button has been depressed. If not, program advances to step 578 and displays the upper frame, after which the program loops back to step 574.

If the result at step 574 was a yes, an inquiry is made at step 590 to determine whether both buttons have been depressed longer than three seconds. If yes, the program loops to step 546, described previously. If not, the displayed function is reset at step 592, and the program returns at step 594.

Figure 3D:
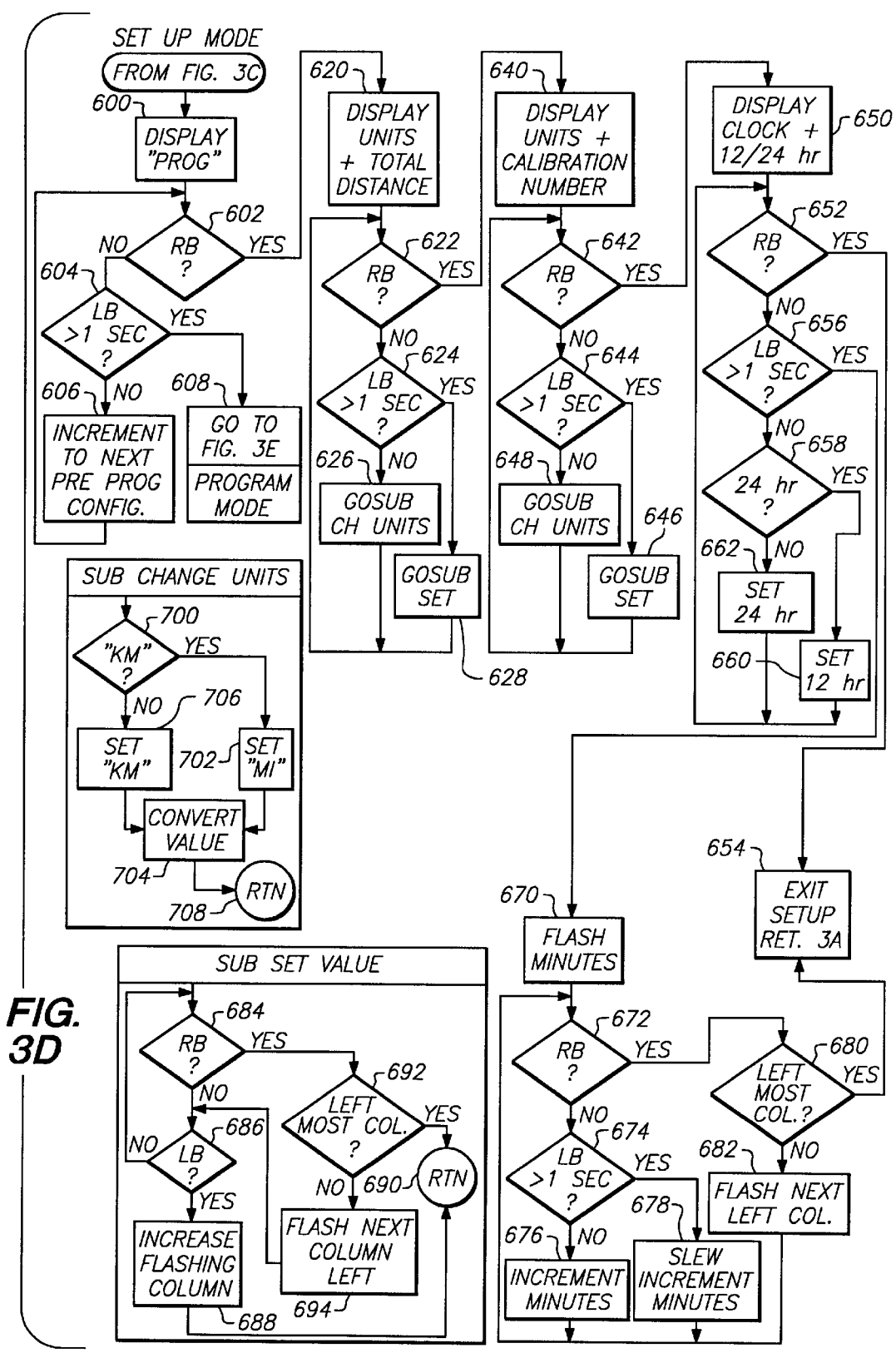

Referring next to FIG. 3D, the "Setup" mode referred to at step 554 may be better appreciated. The process continues from FIG. 3C and advances to step 600 by displaying "PROG" in the annunciator. An inquiry is then made at step 602 to determine whether the right button has been depressed. If not, a further inquiry is made at step 604 to determine whether the left button has been depressed longer than one second. If not, the program advances to step 606 and increments to the next prestored program configuration. It will be appreciated that, in a presently preferred embodiment, several predetermined programs may be stored in memory, and the user selects which, if any, of these predetermined programs to use. It some embodiments it may be desirable not to provide such predetermined programs, although this generally offers less flexibility to the user. After incrementing at step 606, the program loops back to step 602. If the inquiry at step 604 yielded a yes, the system enters "Program" mode at step 608. Program mode is described hereinafter in FIG. 3E.

If the result at step 602 was a yes, the program advances to step 620 and displays units and total distance, after which an inquiry is made at step 622 to determine whether the right button has been depressed. If no, a further inquiry is made at step 624 to determine whether the left button has been depressed longer than one second. If yes, the program advances to step 628 and runs a "GOSUB SET VALUE" subroutine. If no, the program advances to step 620 and runs a "GOSUB CHANGE UNITS" subroutine, each of which will be described hereinafter. After either routine, the program loops back to step 622.

When a yes result is yielded at step 622, the program advances to step 640 and displays units and calibration number. A further inquiry is then made at step 642 to determine whether the right button has been depressed. If not, a check is made at step 644 to determine whether the left button has been depressed longer than one second. If so, the GOSUB SET VALUE subroutine is entered at step 646; if not, the GOSUB CHANGE UNITS subroutine is entered at step 648. After the completion of either subroutine, the program loops back to step 642.

If a yes resulted at step 642, the program advances to step 650 and displays a clock function in 12/24 hours mode. A check is then made at step 652 to determine whether the right button has been depressed. If so, the program exits setup at step 654 and returns to FIG. 3A. If not, a check is made at step 656 to determine whether the left button has been depressed longer than one second. If not, a check is made at step 658 to determine whether the clock is currently in 24-hour mode. If yes, the clock is toggled to 12-hour mode at step 660; if no, the clock is toggled to 24-hour mode at step 662.

If a yes results at step 656, the program advances to step 670 and flashes minutes on the display. A check is then made at step 672 to determine whether the right button has been depressed. If no, a further inquiry is made at step 674 to determine whether the left button has been depressed longer than one second. If not, the program advances at step 676 by incrementing minutes by one. If yes, minutes are incremented by slewing at step 678. If a yes results at step 672, a further inquiry is made at step 680 to determine whether the current display is the left-most column. If yes, the program returns at step 654; if not, the program advances at step 682 by flashing the next column to the left, after which the program loops back to step 672.

The SET VALUE subroutine begins at step 684 by checking whether the right button has been depressed. If no, a check is made at step 686 to determine whether the left button has been depressed. If no, the program loops back to step 684. If yes, the current column, which is typically flashing in a presently preferred embodiment, is incremented at step 688, after which the subroutine returns at step 690. If the check at step 684 yielded a yes, a further check is made at step 692 to determine whether the column currently available for incrementing is the left-most column. If yes, the subroutine returns via step 690; if no, the program increments at step 694 to permit the next column to the left to be incremented, usually indicated by causing that column to flash. The program then loops to step 686.

The CHANGE UNITS subroutine simply permits the user to toggle between kilometers and miles, and begins at step 700 by determining whether the current units are kilometers. If so, the subroutine advances by toggling to "miles" at step 702, and continues at step 704 by converting the appropriate values. If not, the subroutine advances to step 706 by maintaining kilometers as the current units, and converts values at step 706. After the values are converted at step 706, the subroutine returns at step 708.

Figure 3E:
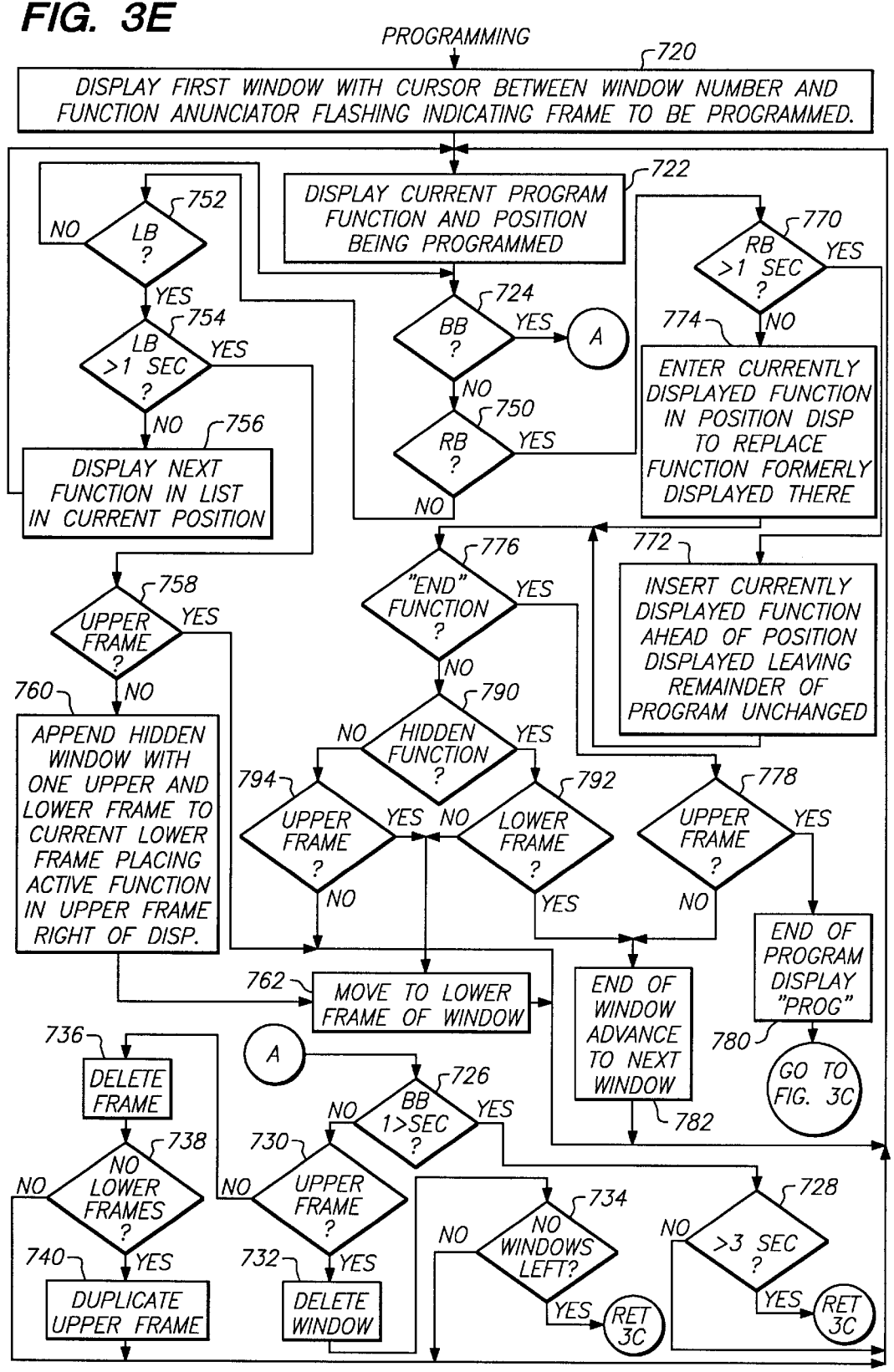

Referring next to FIG. 3E, the programming mode of the current invention may be better appreciated. As previously noted, programming mode is entered from step 608 of FIG. 3D. The process begins at step 720 by displaying the first window, with a cursor between the window number and the function annunciator flashing, indicating the frame to be programmed. The program then advances to step 722, and displays the current program function and the position being programmed. The program then inquires, at step 724, whether both buttons have been depressed. If so, a further inquiry is made at step 726 to determine both buttons have been depressed longer than one second. If so, a still further inquiry is made at step 728 to determine if both buttons have been depressed longer than three seconds. If so, the program returns to FIG. 3C; if not, the program returns to step 722.

If the result at step 726 was a no, a check is then made at step 730 to determine whether the current frame is an upper frame. If yes, the window is deleted at step 732 and an inquiry is made at step 734 whether any windows are left. If not, the program loops back to step 722; if so, the program loops back to FIG. 3C. If the result at step 730 was a no, the program advances at step 736 by deleting the current frame, and then performs a check at step 738 to determine if there are no additional lower frames. If there are no other lower frames, yielding a yes at step 738, the upper frame is replicated in the lower frame at step 740, since in a presently preferred embodiment no blank frames are permitted. If there are lower frames, yielding a no at step 738, the program loops back to step 722.

If the result at step 724 was that both buttons were not depressed, a check is then made at step 750 to determine whether the right button was depressed. If not, a check is then made at step 752 to determine whether the left button was depressed. If not, the program loops back to step 724. If yes, a further inquiry is made at step 754 to determine whether the left button was depressed longer than one second. If not, the program advances to step 756 by displaying in the current position the next function in the list of functions which make up the current program. The program then loops back to step 722. If the left button was depressed longer than one second, an inquiry is made at step 758 to determine whether the current frame is an upper frame. If not, meaning that the current frame is a lower frame, the program advances to step 760 and appends a hidden window with one upper and one lower frame to the current lower frame. The displayed active function is placed in the upper frame with an "H" at the right of the display, to indicate the hidden nature of the function. The program then advances to step 762 by moving to the lower frame of the current window, after which the program loops back to step 722. The program also loops back to step 722 if the result at step 758 was a yes.

If the result at step 750 was a yes, the program advances by inquiring at step 770 whether the right button has been depressed longer than one second. If yes, the program advances to step 772 and the currently displayed function is inserted ahead of the current position displayed, with the remainder of the program left unchanged. If not, the program advances at step 774 such that the currently displayed function is entered at the currently displayed position in the sequence, and replaces the function that previously occupied that position. In either event, the program then advances to step 776 and inquires whether the currently displayed function is the "END" function. If so, an inquiry is made at step 778 to determine whether the current frame is an upper frame. If so, the user has indicated that no further windows are desired in the current program. In this case, the program advances to step 780 and "PROG" is displayed to indicate the program has been completed, and the program returns to FIG. 3C. If the result at step 778 was a no, meaning the end of a window has been reached, the program advances to step 782 and advances to the next window.

If the result at step 776 was a no, a further inquiry is made at step 790 to determine whether the current function is a hidden function. If no, a still further inquiry is made at step 794 to determine whether the current frame is an upper frame. If yes, the program advances to step 762, described previously. If no, the program loops back to step 722. If the result at step 790 is a yes, a further inquiry is made at step 792 to determine whether the current frame is a lower frame. If yes, the program branches to step 782, described previously. If not, the program advances to step 762, also described previously.

It will be appreciated from the foregoing that a new and novel method and apparatus for controlling and displaying a selectable plurality of functions in a device such as a multifunction timepiece has been described, with the use of only two buttons to simplify operation and programming. The achievement of these objectives is made possible, in part, through the use of a bit-mapped annunciator display, such as a dot matrix display.

Having fully described various embodiments of the present invention, numerous alternatives and equivalents which do not depart from the invention will be apparent to those skilled in the art. It is therefore intended that the invention not be limited by the foregoing description, but only by the appended claims.

What is claimed is:

1. A method for programming a bicycle computer or sports timepiece device that performs a device-created set of computational functions to display current status of selected functions in a sequence and at locations in a viewable display window selected by a user of said device, comprising the steps of:

(1) changing said device from a display mode to a programming mode, (2) opening a frame of a display window, (3) sequencing, in said frame of said display window, through a device-created set of functions, (4) selecting a function to be displayed in said frame by activation of a switch by said user while said function is displayed in said frame, (5) repeating steps (2)–(4) until all desired functions to be displayed in said window have been selected, (6) opening, as desired, a further display window, (7) repeating steps (2)–(5), as necessary, for any further windows desired to be displayed, (8) storing information defining said sequence of windows, said frame or frames in each window, and said function in each frame in memory to provide a user-defined sequence of user-defined windows, and (9) terminating said programming mode, whereby said device reverts to said display mode and sequential activation of a switch while said device is in said display mode recalls and displays said sequence of user-defined windows.

2. The method of claim 1, wherein user input in steps (1)–(9) is carried out by user activation of two depressable buttons.

3. The method of claim 1, wherein different input information is provided to said device by use of said switches individually or concurrently and different input information is provided by activation of an individual input switch for different intervals of time.

4. The method of claim 1, wherein user input for step (2) is carried out by activation of a depressable button by said user.

5. The method of claim 1, wherein user input for step (3) is carried out by activation of a second switch or by activation of the same switch used in step (2) for a different time interval than in step (2).

6. A method for displaying current status of calculated functions in a bicycle computer or sports timepiece device containing a microprocessor in a sequence and at locations on a display screen selected by a user using a minimal user-actuable input system, comprising:

providing calculation of a device-created set of functions by said microprocessor, said set of functions being available for selection by a user of said device from an initial device-created sequence of said functions, providing a display for displaying information in the form of windows, each window capable of containing a frame at one or more locations of said window, each of said frames displaying current status of one of said functions, providing user-actuable means for selecting, from said initial microprocessor-created sequence of functions, (1) a user-specified sequence of windows, (2) a user-specified number frames displayed in each window, with each frame of a given window being at a different location in said window relative to other frames of said window, each of said frames of a given window being opened in turn by said user, and (3) a user-specified fiction displayed in each frame, thereby establishing a user-specified sequence of windows displaying a subset of said functions, wherein any frame of any window can comprises any member of said set of functions, providing a memory for storing the user-specified sequence, and providing user-actuable means for displaying, in turn, members of said user-specified sequence.

7. The method of claim 6, further comprising:

providing automatic collection of data from at least one source, wherein said data is provided to said microprocessor for use in calculating current status of at least one of said functions.

8. The method of claim 7, wherein said data comprises altitude data.

9. The method of claim 7, wherein said data comprises data relating to the location of said device.

10. The method of claim 9, wherein said device is a bicycle computer and said data comprises data from a wheel sensor relating to distance traveled.

11. The method of claim 6, wherein said device comprises an internal clock and information from said clock is used in calculating current status of at least one of said functions.

12. The method of claim 11, wherein said internal clock generates a time display.

13. The method of claim 6, further comprising:

providing at least one pre-established sequence of a first subset of said functions for display in the form of windows, each window containing a frame at one or more different locations of said window, each of said frames containing one of said functions.

14. The method of claim 13, wherein the function displayed in one or more frame of said pre-established sequence can be replaced by a different function from said set by said user, wherein one or more window or frame of said pre-established sequence can be individually deleted, and wherein one or more new windows can be created by said user and added to said pre-established sequence, thereby modifying said pre-established sequence to create a user-specified sequence, said replacement being accomplished by sequentially examining individual frames of said windows and sequentially scrolling through said set of functions and selecting a different function, if replacement is desired.

15. The method of claim 6, wherein said device is a timepiece and at least one of said fields displays time.

16. A bicycle computer or sports timepiece device containing a microprocessor and having a display for displaying current status of calculated functions by said microprocessor, comprising:

a program stored in said device providing calculation of a device-created set of functions by said microprocessor, said set of functions being available for selection and display by a user of said device, a display for displaying information in the form of windows, each window capable of containing a frame at one or more locations of said window, each of said frames displaying one of said functions, user-actuable input means coupled with a user-selectable second program stored in said device for selecting a user-specified sequence of windows, a user-specified number frames in each window, and a user-specified function from said set of functions to be displayed in each frame, wherein activation of said user-actuable input means while said second program is operational causes said second program to establish a user-specified sequence of windows displaying a subset of said functions, wherein any frame of any window can comprises any member of said set of functions, memory for storing the user-specified sequence, and user-actuable input means for accessing, in turn, members of said user-specified sequence.

17. The device of claim 16, further comprising:

data input means for automatic collection of data from at least one source, wherein said data is provided to said microprocessor for use in calculating current status of at least one of said functions.

18. The device of claim 17, wherein said device comprises an internal clock and information from said clock is used in calculating current status of at least one of said functions.

19. The device of claim 18, wherein said internal clock generates a time display.

20. The device of claim 17, wherein said data comprises data relating to the location of said device.

21. The device of claim 17, wherein said device is a bicycle computer and said data comprises data from a wheel sensor relating to distance traveled by said vehicle.

22. The device of claim 17, wherein said data comprises altitude data.

23. The device of claim 16, further comprising:

a pre-established sequence of a first subset of said functions for display in the form of windows, each window containing a frame at one or more locations of said window, each of said frames containing one of said functions, information defining said pre-established sequence being stored in said memory.

24. The device of claim 23, wherein said second program stored in said device allows the function displayed in one or more frame of said pre-established sequence to be replaced by a different function from said set by said user, one or more window or frame of said pre-established sequence to be individually deleted by said user, and one or more new windows to be created by said user and added to said pre-established sequence, thereby modifying said pre-established sequence to create a user-specified sequence.

25. The device of claim 16, wherein said device is a timepiece and at least one of said fields displays time.

26. The device of claim 16, wherein said user-actuable input means comprises a depressable button.

27. The device of claim 16; wherein said second program comprises the steps of:

(1) changing said device from a display mode to a programming mode, (2) opening a frame of a display window, (3) sequencing, in said frame of said display window, through said device-created set of functions, (4) selecting a function to be displayed in said frame by activation of a switch by said user while said function is displayed in said frame, (5) repeating steps (2)–(4) until all desired functions to be displayed in said window have been selected, (6) opening, as desired, a further display window, (7) repeating steps (2)–(5), as necessary, for any further windows desired to be displayed, (8) storing information defining said sequence of windows, said frame or frames in each window, and said function in each frame in memory to provide a user-defined sequence of user-defined windows, and (9) terminating said programming mode, whereby said device reverts to said display mode and sequential activation of a switch while said device is in said display mode recalls and displays said sequence of user-defined windows.

28. A method for programming data display in a bicycle computer or sports timepiece device having a display window, comprising the steps of:

(1) changing said device from a display mode to a programming mode in response to user activation of a switch, (2) opening a frame at an initial location of said display window, (3) sequencing, in said frame of said display window, through a device-created set of functions, (4) selecting a function to be displayed in said frame by activation of a switch by said user while said function is displayed in said frame, (5) optionally opening a further frame at a location of said window that allows all frames of said window to be viewed at the same time, (6) when said further frame is opened, repeating steps (2)–(4) to select a function for display in said further frame, (7) optionally repeating steps (5) and (6), (8) optionally closing said open window and opening a further display window in response to user activation of a switch after desired frames and functions of said open window have been selected, (9) repeating steps (2)–(7), as necessary, to select frames and functions for said further display window,

(10) repeating, if desired, steps (8) and (9) for any further window or windows desired by said user,

(11) storing information defining said sequence of windows, said frame or frames in each window, and said function in each frame in memory of said device, and

(12) terminating said programming mode, whereby said device reverts to said display mode and whereby activation of a switch by said user while said device is in said display mode recalls and displays said sequence of user-defined windows, thereby displaying functions selected from said device-created set of functions in a sequence of windows and at locations of frames within said windows selected by said user.

29. A method for programming a bicycle computer or sports timepiece device that performs a device-created set of computational functions and that has a display screen capable of displaying at least a subset of said functions to display current status of selected functions in a sequence and at locations in said display screen selected by a user of said device, comprising the steps of:

(1) changing said device from a display mode to a programming mode, whereby said device has a display window coextensive with said display screen, (2) opening a frame at an initial location of said display window, (3) sequencing, in said frame of said display window, through said device-created set of functions, (4) selecting a function to be displayed in said frame by activation of a switch by said user while said function is displayed in said frame, (5) optionally opening a further frame of said display window, wherein said further frame is at a different location in said window than any earlier frames opened in said window, (6) sequencing, in said further frame of said display window, through said device-created set of functions, (7) selecting a function to be displayed in said further frame by activation of a switch by said user while said function is displayed in said frame, (8) optionally repeating steps (5)–(7) until all desired functions to be displayed in said window have been selected, (9) opening, as desired, a further display window,

(10) repeating steps (9), as necessary, for any further windows desired to be displayed,

(11) storing information defining said sequence of windows, said frame or frames in each window, and said function in each frame in memory to provide a user-defined sequence of user-defined windows, and

(12) terminating said programming mode, whereby said device reverts to said display mode and sequential activation of a switch while said device is in said display mode recalls and displays said sequence of user-defined windows.

\* \* \* \* \*